United States Patent [19]
Kato

[11] Patent Number: 6,042,524
[45] Date of Patent: Mar. 28, 2000

[54] TOOL STORAGE DEVICE HAVING TILTING MECHANISM

[75] Inventor: Fumihiko Kato, Nagoya, Japan

[73] Assignee: Brother Kogyo Kabushiki Kaisha, Nagoya, Japan

[21] Appl. No.: 09/123,516

[22] Filed: Jul. 28, 1998

[30] Foreign Application Priority Data

| Jul. 31, 1997 | [JP] | Japan | ................................... | 9-206571 |
| Jul. 31, 1997 | [JP] | Japan | ................................... | 9-206572 |
| Jul. 31, 1997 | [JP] | Japan | ................................... | 9-206573 |

[51] Int. Cl.$^7$ .................................................. B23Q 3/157
[52] U.S. Cl. ................................. 483/62; 483/13; 483/41
[58] Field of Search ................................. 483/36, 41, 44, 483/48, 62, 59, 66, 68, 13

[56] References Cited

U.S. PATENT DOCUMENTS

| 4,335,500 | 6/1982 | Munekata et al. | ..................... 483/62 X |
| 4,404,728 | 9/1983 | Ishikawa | ..................... 483/13 |
| 5,554,087 | 9/1996 | Huang et al. | ............................. 483/62 |
| 5,704,885 | 1/1998 | Lee | ............................. 483/62 |
| 5,871,426 | 2/1999 | Akaki et al. . | |

FOREIGN PATENT DOCUMENTS

| 2366097 | 6/1978 | France | ..................................... 483/41 |
| 7629539 | 6/1978 | France | ..................................... 483/41 |
| 22677 | 3/1978 | Japan | ..................................... 483/41 |
| 4-2756 | 1/1992 | Japan . | |

*Primary Examiner*—William Briggs
*Attorney, Agent, or Firm*—Oliff & Berridge, PLC

[57] ABSTRACT

In a tool storage device for a machine tool, a tilting mechanism is provided with a positioning member fixed in a magazine base, a turning member turnably mounted to the outer periphery of the positioning member. The center of turning of a tool pot is kept at a specified position by the positioning member so that the tool pot is integrally turned with the turning member by turning the turning member by a link rod to a tool storage state or to a tool exchange state. The center of turning of the tool pot agrees with that of the turning member, so that a friction force is not produced therebetween. The link rod is driven hydraulically by a cylinder which is locked to maintains the final position of the tool pot when the fluid supply to the cylinder is stopped. The tool pot is restricted from dropping from the transfer mechanism.

20 Claims, 5 Drawing Sheets

TOOL STORAGE DEVICE HAVING TILTING MECHANISM

CROSS REFERENCE TO RELATED APPLICATION

This application relates to and incorporates herein by reference Japanese Patent Applications No. 09-206571, No. 09-206572 and No. 09-206573, all being filed on Jul. 31, 1997.

BACKGROUND OF THE INVENTION

1. Field of the Invention

The present invention relates to a tool storage device mounted on a machining center or tool machine having an automatic tool exchange mechanism.

2. Description of Related Art

A conventional tool storage device mounted on a machining center or machine tool which transfers a tool pot to a specified dividing position along a specified path and turns the tool pot thus transferred to the specified dividing position to a tool storage state or to a tool exchange state.

Japanese Utility Model Publication No. 4-2756 discloses, for example, a device which grips a part projected from the back side of a tool pot by claws of a movable mechanism by moving up or down the movable mechanism. In this tool storage device, a rotatable roller is disposed at the part projected from the back side of the tool pot. Since a strong friction force is not applied between the tool pot and the movable mechanism, the frictional wear between the roller and the movable mechanism can be reduced and the tool pot can be turned smoothly in response to the up-and-down movement of the movable mechanism. However, in the tool storage device having the roller at the part gripped by the movable mechanism, since each tool pot is required to have the roller and a support shaft therefor separately from a turning shaft disposed at the center of the turning of the tool pot, the tool pot and hence the whole tool storage device tend to necessitate high manufacturing cost.

Further, in the conventional tool storage device, the movable mechanism uses a driving source such as an air cylinder or a hydraulic cylinder as a turning mechanism for turning the tool pot to the tool storage state or to the tool exchange state. In this arrangement, when an air supply to the air cylinder from an air source is stopped to stop a machine operation in a factory, pressure for keeping the piston in the air cylinder at one dead center is not applied to the piston and only the self weight of the tool pot or the self weight of the other movable parts is applied to the piston. This sometimes results in turning the tool pot which is to be kept essentially in the tool storage state to the tool exchange state, or in turning the tool pot which is to be kept essentially in the tool exchange state to the tool storage state. When the machine operation is to be restarted in the factory, the tool pot is possibly held turned to undesired state erroneously. This erroneous condition is required to be removed before the tool machine is restarted. Further, when the air supply to the air cylinder is restarted, the piston in the air cylinder might be returned suddenly to an original position. Thus, it becomes also necessary to take some safety measures so that an operator should not touch the piston carelessly.

Still further, in the conventional tool storage device, in order to restrict the tool pot from dropping from a transfer mechanism during the transfer, for example, a bearing hole is provide in the tool pot and in the parts of the transfer mechanism, respectively, and a turning shaft is inserted through the bearing hole and is mounted such that the turning shaft does not slip off to thereby considerably firmly join the tool pot to the parts. In this case, joining the tool pots to the transfer mechanism requires considerable labor and time. In particular, when the tool pots are mounted on the transfer mechanism after the transfer mechanism is mounted in the tool storage device, a manual work in a narrow limited space is required. On the other hand, when tool pots are mounted to the parts of the transfer mechanism to be attached together to the transfer mechanism, it is necessary to mount the parts of the transfer mechanism whose weight is increased by many tool pots. In either case, the mounting or dismounting the tool pots for an assembling work or maintenance is extremely troublesome.

SUMMARY OF THE INVENTION

It is therefore a first object of the present invention to provide a tool storage device having tool pots which are simple in construction and low in manufacturing costs.

It is a second object of the present invention to provide a tool storage device which can suitably maintain a desired tool pot position even after a fluid supply to a fluid-operated driving source is stopped.

It is a third object of the present invention to provide a tool storage device which can mount or dismount tool pots on or from a transfer mechanism easily.

In a tool storage device according to a first aspect of the present invention, a tool pot is turned to a tool storage state or a tool exchange state in response to a turning member. The turning member is turned around the same axis as the center of the turning of the tool pot disposed at a dividing position. The turning member and the tool pot are turned integrally without changing a relative position therebetween and hence a strong friction force is hardly applied between the turning member and the tool pot. Thus, even if the tool pot has neither roller nor shaft for the roller, it is less likely that the tool pot or the turning member is subjected to the frictional wear or the tool pot is disabled to turn because of the friction resistance.

The turning member preferably has a structure adapted for receiving the tool pot transferred by a transfer mechanism and integrally turnable with the tool pot after receiving the tool pot.

Furthermore, the tool storage device has a driving mechanism which turns the turning member. For example, if the driving mechanism has a part moving straight like an air cylinder, it is preferred that a power transmission mechanism be constructed by joining a link member to both of the turning member and the air cylinder such that the link member can be turned so as to change a linear movement to a rotational movement to transmit the power. Still further, if the driving mechanism has a rotating part like a motor, it is preferred that a power transmission mechanism be constructed by interposing a gear train or a belt between the driving mechanism and the turning member to transmit the rotation of the motor to the turning member.

In a tool storage device according to a second aspect of the present invention, a fluid-operated mechanism is displaced from one position of a first and second positions to the other position and then a lock mechanism locks the fluid-operated mechanism to restrict the fluid-operated mechanism from moving to an undesired state. The lock mechanism unlocks the fluid-operated mechanism before the fluid-operated mechanism starts to change its position, thereby alleviating necessity of a separate unlocking operation each time the fluid-operated mechanism is to be moved from one position to the other.

The position where the lock mechanism locks the fluid-operated mechanism is determined depending on which position is suitable for the initial position, that is, either at the first position for keeping the tool pot in the tool storage state or at the second position for keeping the tool pot in the tool exchange state. Further, in the case where the tool pot may be in any of the tool storage state and the tool exchange state but where the tool pot is not to be in the middle position of both states, the lock mechanism may lock the fluid-operated mechanism in either positions.

In a tool storage device according to a third aspect of the present invention, a transfer mechanism only removably holds tool pots and a dropping restricting mechanism is put into contact with each tool pot to regulate the movable range of the tool pot. The regulation of the movable range of the tool pot is released only by moving at least a part of the dropping restricting mechanism so that the tool pot can be easily mounted on or dismounted from the transfer mechanism.

BRIEF DESCRIPTION OF THE DRAWINGS

Other objects, features and advantages of the present invention will become more apparent from the following detailed description made with reference to the accompanying drawings. In the accompanying drawings.

DETAILED DESCRIPTION OF THE PREFERRED EMBODIMENT

Figure 1:
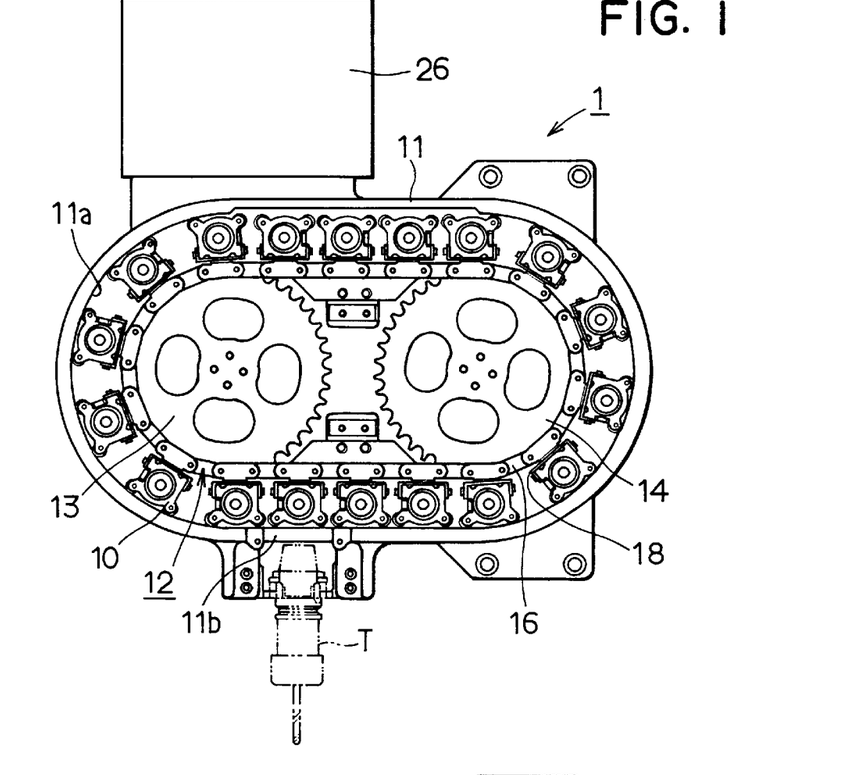
FIG. 1 is a front view of a tool storage device according to an embodiment of the present invention.
Figure 2:
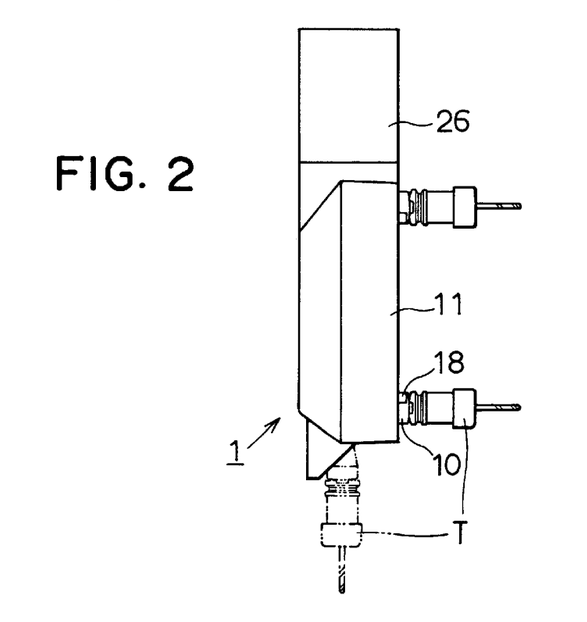
FIG. 2 is a side view of the tool storage device shown in FIG. 1.

A tool storage device according to an embodiment is illustrated in FIGS. 1 and 2 and is denoted generally by reference numeral 1. The tool storage device 1 is provided with a plurality of tool pots 10 that are mounted on a transfer mechanism 12 disposed inside a tool magazine base 11 fixed to a machine tool body (not shown).

The transfer mechanism 12 is provided with a pair of sprockets 13 and 14 rotatably disposed inside the magazine base 11, an endless chain 16 looped over the pair of sprockets 13 and 14, brackets 18 fixed to the outer peripheral side of the chain 16, and the like. The tool pots 10 are attached to the corresponding brackets 18 to be transferred with the chain 16 on a circulation path.

Further, the tool pots 10 are rotatably or turnably attached to the brackets 18. The inner wall surface 11a of the outer peripheral part of the magazine base 11 is in contact with the tool pots 10 in most of the transfer path of the tool pots 10. Thus, the innerwall surface 11a regulates the turning of the tool pot 10 and the tool pot 10 is kept in a tool storage state in which a tool T is held perpendicularly to the plane of the magazine base 11 thus facing the front as shown by solid line in FIGS. 1 and 2.

On the other hand, a dividing opening 11b is formed on the bottom side of the magazine base 11 so that the tool pot 10 can be turned from the tool storage state to a tool exchange state in which the tool T is held in parallel with the plane of the magazine base 11 thus facing downward as shown by double dot & dash line in FIGS. 1 and 2. That is, the tool T is turned to the tool exchange state only at a position (dividing position) where the dividing opening 11b is formed.

An actuator case 26 is provided on the top of the magazine base 11 and houses a motor (not shown) for driving the sprocket 13 and the like.

Figure 3:
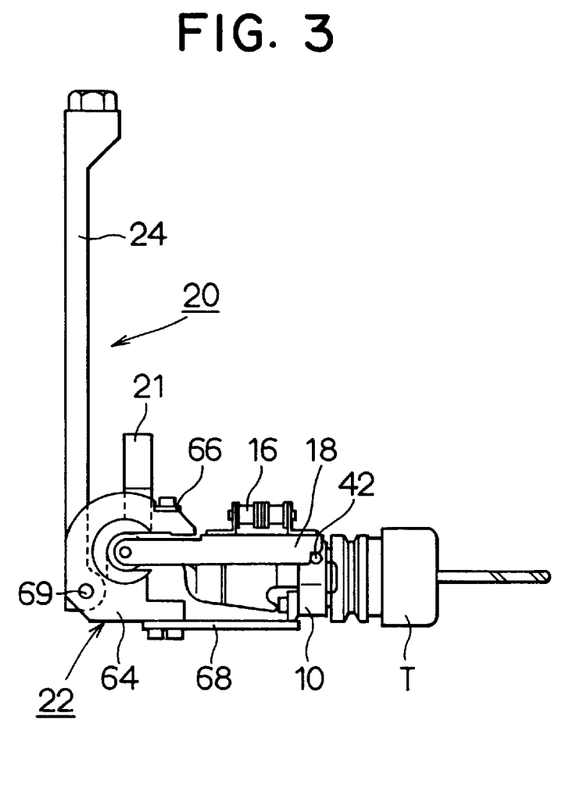
FIG. 3 is a side view around a tilting mechanism when a tool pot is in a tool storage state in the tool storage device.
Figure 4:
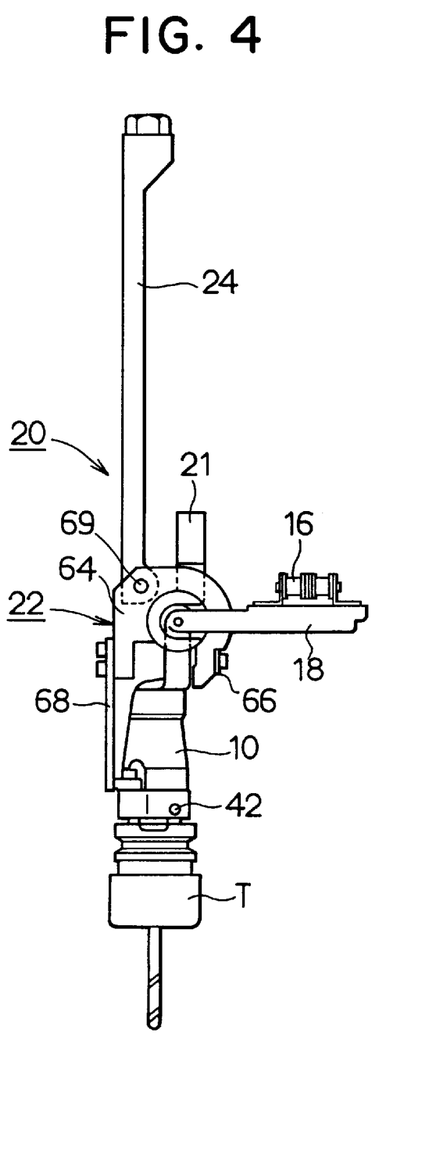
FIG. 4 is a side view around the tilting mechanism when the tool pot is in a tool exchange state in the tool storage device.
Figure 8A:
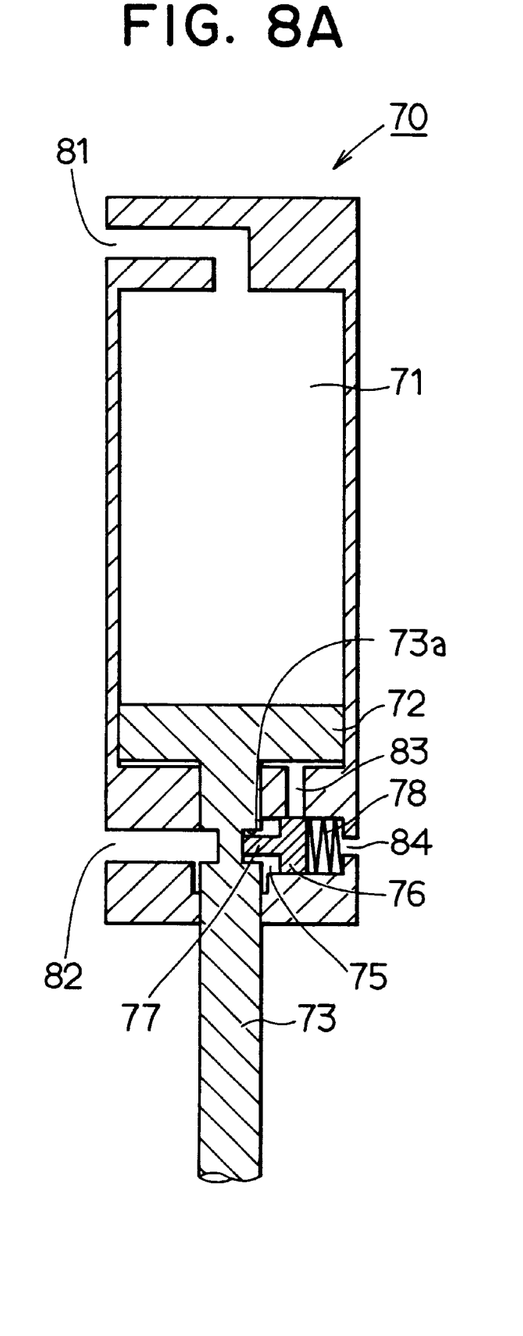
FIGS. 8A and 8B are longitudinal sectional views of an air cylinder in a state in which a piston is displaced to a bottom dead center and in a state in which the piston is displaced to a top dead center, respectively.
Figure 8B:
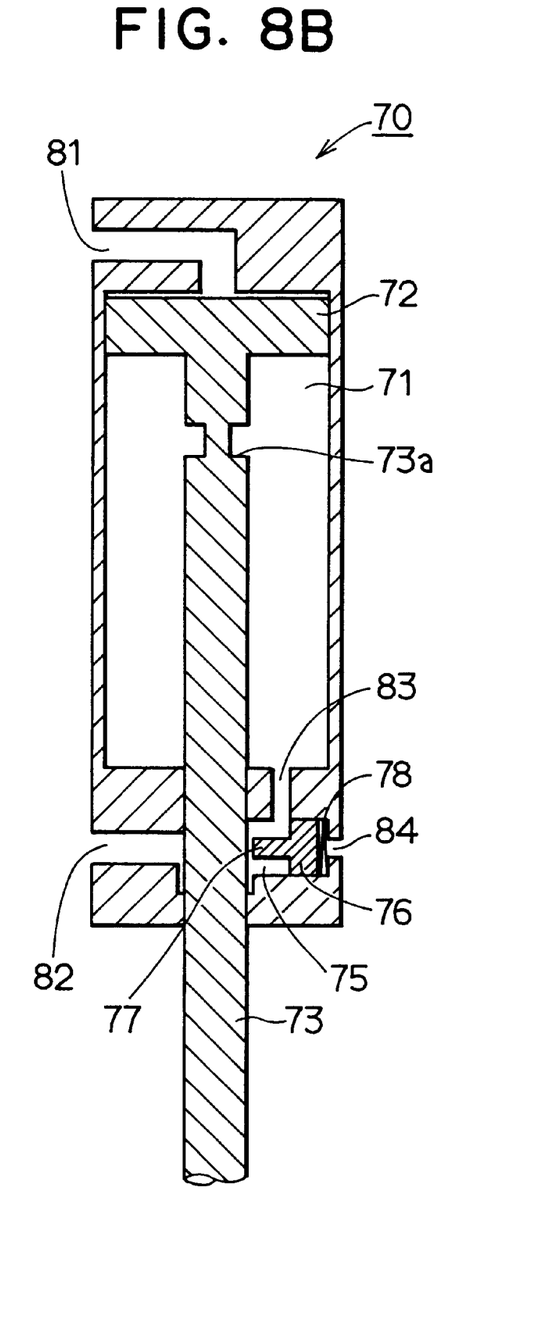

As shown in FIGS. 3 and 4, a tilting mechanism 20 for turning the tool pot 10 in the tool storage state or in the tool exchange state is arranged at the dividing position. The tilting mechanism 20 is provided with a positioning member 21 fixed to the magazine base 11, a turning member 22 turnably mounted to the cuter periphery of the positioning member 21, a link rod 24 for turning the turning member 22, and the like. The link rod 24 is operatively coupled with the actuator 26 through an air cylinder (FIGS. 8A and 8B). The positioning member 21 keeps the center of turning of the tool pot 10 at a specified position so that the tool pot 10 is turned to the tool storage state (FIG. 3) or to the exchange position (FIG. 4) by turning the turning member 22 by moving up or down the link rod 24.

Figure 5A:
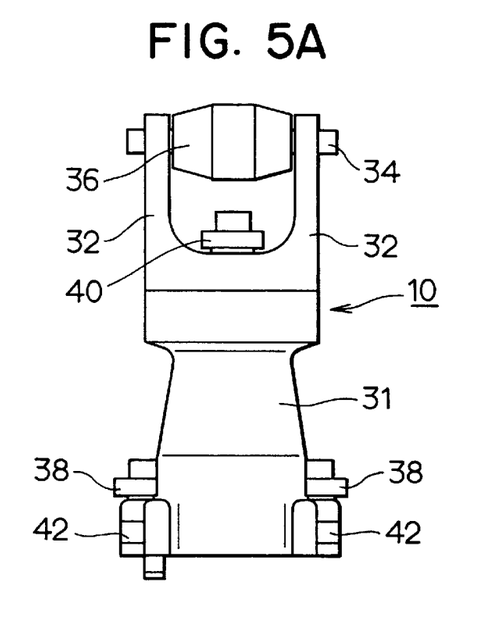
FIGS. 5A–5C are a plan view, a side view and a front view of the tool pot in the tool storage device, respectively.
Figure 5B:
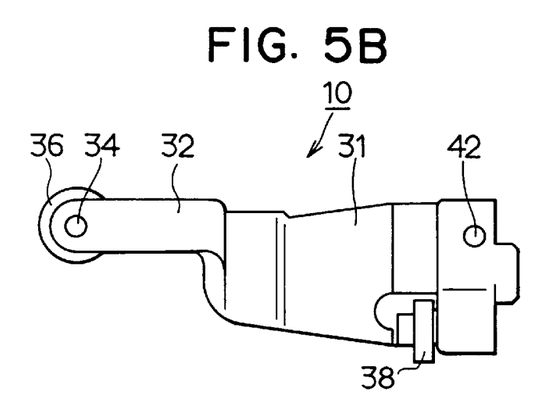
Figure 5C:
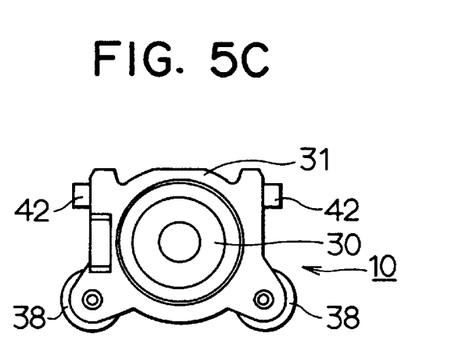

As shown in FIGS. 5A–5C, the tool pot 10 is provided with a main body 31 having a tool mounting opening 30 at the front side thereof, a pair of pot arms 32 projecting backward in parallel from the back side of the main body 31, a turning shaft 34 mounted to the tip ends of the pot arms 32 with the axis thereof in the right-left direction with both ends thereof projecting outside from the pair of pot arms 32, a positioning roller 36 rotatably mounted around the outer periphery of the turning shaft 34 and inside the pair of pot arms 32, transfer rollers 38 each of which is mounted to the bottom surface side of the main body 31 and is rotated around an axis extending in the back-and-forth direction, an auxiliary roller 40 which is mounted inside the roots of the pot arms 32 and is rotated around an axis extending in the back-and-forth direction, retaining pins 42 provided near the front side on both sides of the main body 31, and the like.

The turning shaft 34 is turnably held by the bracket 18. Further, the positioning roller 36 is fitted in the positioning member 21 when the tool pot 10 is transferred to the dividing position. The positioning roller 36 is tapered toward both longitudinal ends such that it is easily engaged into the positioning member 21. Furthermore, when the tool pot 10 is put into contact with the inner wall surface 11a of the magazine base 11 (FIG. 1) while it is transferred, the transfer roller 38 is rotated to restrict the tool pot 10 from rubbing or sliding the magazine base 11 at a contact place. In addition, the auxiliary roller 40 is not put into contact with anything when the chain 16 is tightened, but if the chain 16 is loosened for some reason, it is put into contact with the members of the magazine base side, or the like, to thereby restrict the positioning roller 36 or the like from being rubbed by the unexpected places.

Figure 6A:
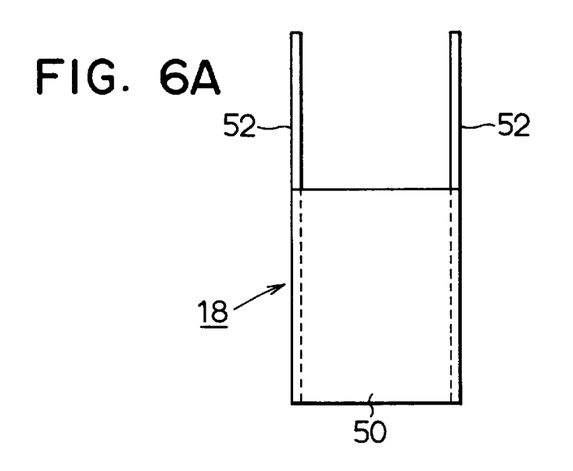
FIGS. 6A–6C are a plan view, a side view and a front view of a bracket in the tool storage device, respectively.
Figure 6B:
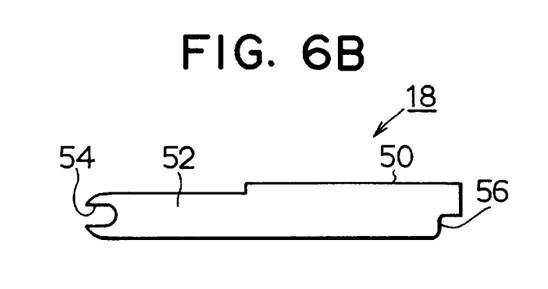
Figure 6C:
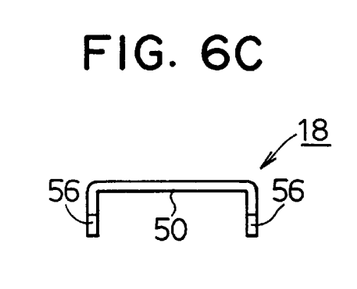

The bracket 18 is made, as shown in FIGS. 6A–6C, by a rectangular chain mounting part 50 which is fixed to the chain 16. Both of its sides are bent downward and extended backward in parallel with each other to provide a pair of bracket arms 52. A first cutout part 54 is formed at the back end of each of the bracket arms 52 and a second cutout part 56 is formed at the front bottom end of each of the bracket arms 52 of the bracket 18. The bracket 18, as shown in FIGS. 3 and 4, is fixed to the chain 16 and is held in a state in which the bracket arms 52 thereof extend generally horizontally or perpendicularly to the link rod 24.

The tool pot 10 and the bracket 18 are turnably joined together by fitting the turning shaft 34 of the tool pot 10 in the first cutout part 54 of the bracket 18. The turning shaft 34 is only fitted in the first cutout parts 54, but if the tool pot 10 is in the tool storage state, as shown in FIG. 3, the retaining pins 42 are fitted in the second cutout parts 56 to put the tool pot 10 in a state where it can not be moved backward. Thus, the turning shaft 34 can not be taken out from the first cutout part 54. Therefore, at the dividing position shown in FIG. 3, or even in the case where the tool pot 10 is transferred to the region other than the dividing position, as far as the tool pot 10 is kept in the tool storage state, there is no possibility that the tool pot 10 drops from the bracket 18. Further, when the tool pot 10 is turned to the tool exchange state at the dividing position, as shown in FIG. 4, the retaining pins 42 are disengaged from the second cutout part 56, but the positioning roller 36 of the tool pot 10 is fitted in the positioning member 21 at the dividing position to thereby also put the tool pot 10 in a state where it can not be moved backward and hence the turning shaft 34 can not be taken out from the first cutout part 54. Thus, there is no possibility that the tool pot 10 drops from the bracket 18 also in the case where the tool pot 10 is at the dividing position. That is, as far as the tool pot 10 is transferred and tilted in the normal movable region by the transfer mechanism 12 and the tilting mechanism 20, there is no likelihood that the tool pot 10 drops from the bracket 18.

On the other hand, in the tool pot 10 and the bracket 18, when the tilting mechanism 20 is removed from the tool storage device 1, there is no member for restricting the tool pot 10 from being mounted or dismounted at the dividing position and hence the tool pot 10 can be freely mounted or dismounted.

Therefore, in order to mount the tool pot 10, the following processes are to be taken. The chain 16 provided with only the brackets 18 is looped over the sprockets 13 and 14 and then the tool pot 10 is fitted in the bracket 18 in the dividing opening 11b. It is turned to the tool storage state and then the chain 16 is moved a predetermined distance. Then other tool pots 10 are repeatedly mounted one by one in the same operations as above in sequence, and finally, the tilting mechanism 20 is mounted.

Accordingly, the tool pot 10 can be mounted in the simple operation thus eliminating the troublesome operations, for example, looping a chain whose weight is extremely increased by the previously mounted tool pots over the sprockets, inserting hands into a narrow space and mounting the tool pots on the chain by the screws or the pins after the chain is looped over the sprockets, or the like.

Figures 7A, 7B:
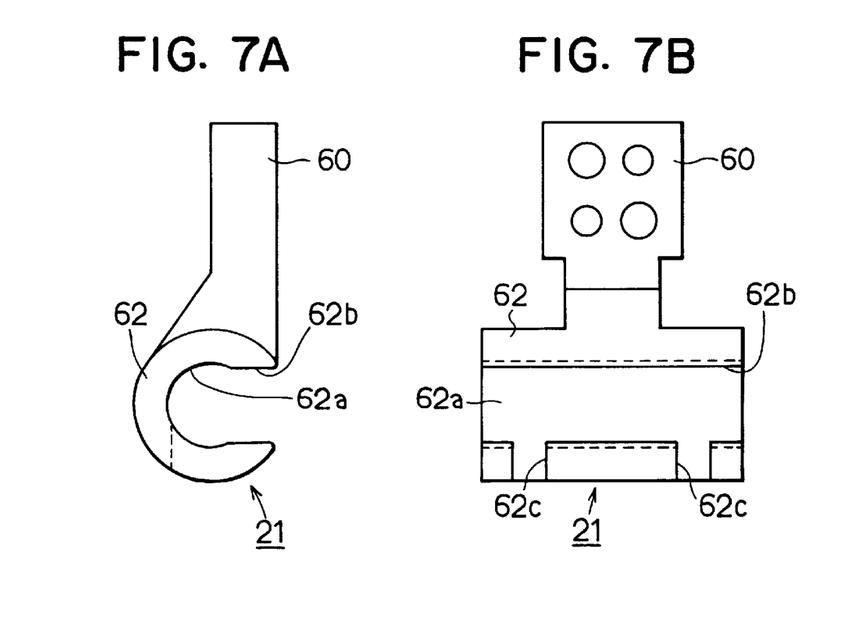
FIGS. 7A and 7B are a plan view and a side view of a positioning member in the tool storage device, respectively.

The positioning member 21 is provided with, as shown in FIGS. 7A and 7B, a mounting part 60 fixed to the magazine base 11 by screws and a roller holding part 62 which is integrally formed with the lower part of the mounting part 60. Its cylindrical inner wall surface 62a holds the positioning roller 36 therein. The roller holding part 62 has a transverse passage 62b for passing the pot arms 32 and the bracket arms 52 when the tool pot 10 is transferred, and longitudinal passages 62c for passing the pot arms 32 when the tool pot 10 is tilted.

Further, the turning member 22 has, as shown in FIGS. 3 and 4, turning plates 64, an upper plate 66 and a link shaft 69. The turning plates 64 are fixed to both sides of the mounting part 60 of the positioning member 21 and are turnably fitted in the outer peripheries of the roller holding part 62. The upper plate 66, the lower plate 68 and the link shaft 69 are fixed so as to connect the pair of turning plates 64 to each other. The top surface of the lower plate 68 is at the same level in height as the inner wall surface 11a of the magazine base 11. In the state shown in FIG. 3, the lower plate 68 closes the dividing opening 11b made in the magazine base 11. Further, the link rod 24 is joined to the link shaft 69 in a manner to allow turning of the link shaft 69 together with the turning plates 64.

The tilting mechanism 20 operates as follows. First, when the tool pot 10 attached to the corresponding bracket 18 is transferred to the dividing position by the transfer mechanism 12, the positioning roller 36 of the tool pot 10 is fitted in the roller holding part 62 of the positioning member 21, and at the same time, the transfer roller 38 of the tool pot 10 is placed on the lower plate 68.

When the link rod 24 is moved up in this state, the turning member 22 is turned around the shaft 69 and the tool pot 10 is also turned to the tool exchange state with the turning member 22. At this time, since the center of turning of the turning member 22 is on the same axis as the center of turning of the tool pot 10, the tool pot 10 does not rub strongly the turning member 22. Further, the turning plate 64, as shown in FIG. 4, is shaped such that it closes the transverse passage 62b of the positioning member 21. Thus, when the tool pot 10 is tilted, the movement of the bracket 18 in the direction of transfer is regulated. Accordingly, for example, even if some external force is applied to the tool pot 10, the tool pot 10 is not displaced accidentally in the direction of transfer with the tool pot 10 held turned to the tool exchange state, but the tool pot 10 is held at the correct position.

After the tool pot 10 is turned to the tool exchange state as above, the tool exchange device such as a tool gripping arm (not shown) is operated to exchange the tool T, and after the tool T is exchanged, the link rod 24 is moved down again to turn the turning member 22. Thus, the tool pot 10 is turned to the tool storage state with the turning member 22 as shown in FIG. 3. In this respect, when the turning member 22 is turned, the transverse passage 62b of the positioning member 21 is opened and is in the state in which the bracket 18 can pass through. Therefore, after that, the tool pot 10 can be transferred again by the transfer mechanism 12.

According to the tool pot 10 and the tilting mechanism 20, the tool pot 10 is turned by the turning member 22 which is turned concentrically with the tool pot 10, and hence the tool pot 10 and the turning member 22 are turned in the state in which both are not displaced from each other in the relative position. Therefore, the tool pot 10 does not rub the turning member 22 strongly. Hence there is no need to arrange a roller or the like for restricting the friction between those members.

Accordingly, the number of rollers to be mounted to the tool pot 10 can be reduced further in the tool storage device 1. As a result, the number of parts of the tool pot is reduced and the structure thereof is made simple, which can reduce parts cost and assembling cost in this tool storage device 1.

Further, since the positioning roller 36 of the tool pot 10 is fitted in the roller holding part 62 of the positioning member 21 to keep the center of turning of the tool pot 10 at the predetermined position, the tool pot 10 can be turned in the sufficiently stable state even though the tool pot 10 is supported by the considerably unstable parts of the chain 16 and the bracket 18.

The driving source for operating the tilting mechanism 20 uses an air cylinder 70 as shown in FIGS. 8A and 8B. The air cylinder 70 is provided with a first cylinder chamber 71, a first piston 72 disposed slidably in the first cylinder chamber 71, and a first piston rod 73 fixed to the first piston 72. Further, the air cylinder 70 is provided with, as a lock mechanism for locking the movement of the first piston 72, a second cylinder chamber 75 arranged at the side of the first piston rod 73, a second piston 76 disposed slidably in the second cylinder chamber 75, a second piston rod 77 fixed to the second piston 76 and movable to engage with an engaging groove 73a formed in the first piston rod 73, and a coil spring 78 arranged in the second cylinder chamber 75 and is put into contact with the second piston 76 to urge the second piston rod 77 in the direction in which the second piston rod 77 is engaged with the first piston rod 73.

Further, a first intake/discharge passage 81 communicates with one chamber of the first cylinder chamber 71 partitioned by the first piston 72, and a second intake/discharge passage 82 communicates with one chamber of the second cylinder chamber 75 partitioned by the second piston 76, and a third intake/discharge passage 83 communicates with another chamber of the first cylinder chamber 71 from the middle position of the second cylinder chamber 75. The other chamber of the second cylinder chamber 75 opens to the outside air of atmospheric pressure via a fourth intake/discharge passage 84.

The air cylinder 70 is disposed in the actuator case 26 (FIG. 1) in the state in which the first piston rod 73 is held at the downmost position, and the link rod 24 of the tilting mechanism 20 is joined to the bottom end side of the first piston rod 73.

In order to turn the tool pot 10 to the tool storage state, as shown in FIG. 8A, air is introduced into the first cylinder chamber 71 from the first intake/discharge passage 81 to move down the first piston rod 73 with the first piston 72 and hence the link rod 24 joined to the first piston rod 73 is also moved down, as shown in FIG. 3, to turn the turning member 22 counterclockwise in FIG. 3 and to turn the tool pot 10 to the tool storage state.

In this respect, in the event that the tool pot 10 is in the tool storage state, since the center of gravity of the tool pot 10 is at the side of the center of turning of the tool pot 10, the tool pot 10 is in the state in which it is always urged in the direction in which it is turned to the tilted position. However, in the case of this air cylinder 70, when the first piston 72 reaches the bottom dead center, the second piston 76 urged by the coil spring 78 is displaced to engage the second piston rod 77 with the engaging groove 73a, which results in making the first piston rod 73 immovable.

Therefore, the tool pot 10 is not turned to the tilted position by the self weight of the tool pot 10. In particular, even if an air supply from the first intake/discharge passage 81 to the first cylinder chamber 71 is stopped and the first piston 72 is not urged downward, the tool pot 10 can be easily kept in the tool storage state.

On the other hand, in order to turn the tool pot 10 to the tool exchange state, as shown in FIG. 8B, air is introduced from the second intake/discharge passage 82 into the second cylinder chamber 75 to displace the second piston 76, which disengages the second piston rod 77 from the engaging groove 73a and unlocks the first piston rod 73. Further, when the second piston 76 is displaced, the second cylinder chamber 75 communicates with the first cylinder chamber 71 via the third intake/discharge passage 83 and air is introduced into the first cylinder chamber 71. As a result, the first piston rod 73 is moved up with the first piston 72 and the link rod 24 joined to the first piston rod 73 is also moved up, as shown in FIG. 4, and the turning member 22 is turned clockwise in the FIG. 4 and the tool pot 10 is turned to the tool exchange state.

Further, in the case where the tool pot 10 is in the tool exchange state, the center of gravity of the tool pot 10 is below the center of turning of the tool pot 10 and hence a force for turning the tool pot 10 from the tilting position is not applied to the tool pot 10. Therefore, the air cylinder 70 is not provided with a mechanism for locking the first piston rod 73 when the first piston 72 reaches the top dead center, but there is no possibility that the tool pot 10 turned to the tool exchange state is displaced to the tool storage state as far as an external force or the like is not applied thereto. In this respect, in order to further surely keep the tool pot 10 in the tool exchange state even when the external force or the like is applied to the tool pot 10, it is recommended that the same lock mechanism be mounted also on the top dead center side of the air cylinder 70.

In the above embodiment, various modifications may be made. For example, the turning member 22 may be operated by the force of a motor. If the tool pot 10 is supported by a support structure having higher stiffness than a support structure comprising the chain 16 and the brackets 18, the center of turning of the tool pot 10 can be held at the proper position without using the positioning member 21 in particular. However, if only the positioning member 21 is used, high stiffness is not required for the support structure between the tool pot 10 and the transfer mechanism 12. Therefore, the adoption of the positioning member 21 will extremely increase flexibility in the design of the support structure between the tool pot 10 and the transfer mechanism 12.

Further, in order to further surely keep the tool pot 10 in the tool exchange state even when an external force or the like is applied to the tool pot 10, it may be preferred that the same lock mechanism be mounted also to the top dead center side of the air cylinder 70. The same lock mechanism can be also constructed by the same air passage to individually provide a first air cylinder for operating the tool pot and a second air cylinder for locking the movement of the movable part moving in cooperation with the first air cylinder 70 and then to join the two air cylinders by a tube or the like. In this case, the second air cylinder may be arranged such that it locks the movable part other than the piston rod of the first air cylinder.

The above embodiment may be modified further in many other ways without departing from the spirit of the invention.

I claim:

1. A tool storage device, comprising:
   a tool pot for holding a tool;
   a transfer mechanism for turnably supporting the tool pot and for transferring the tool pot along a specified path including a specified dividing portion;
   a turning regulating mechanism for regulating the turning of the tool pot at a position other than the dividing position on the specified path and for keeping the tool pot in a tool storage state; and
   a tilting mechanism for turning at the dividing position the tool pot to one of the tool storage state and a tool exchange state in which the tool pot is mounted and dismounted, wherein the tilting mechanism includes:

a turning member disposed to turn a out an axis coincident with the axis about which the tool pot turns when disposed at the dividing position for turning the tool pot disposed at the dividing position to the tool storage state and the tool exchange state when turned, and a driving mechanism for driving the turning member to turn.

2. The tool storage device according to claim 1, further comprising:

a positioning member for supporting the tool pot disposed at the dividing position and for keeping the center of turning of the tool pot at a specified position.

3. The tool storage device according to claim 2, wherein the tool pot has a roller disposed in a state in which an axis thereof agrees with the center of turning of the tool pot, and a support member for supporting the roller rotatably thereon.

4. The tool storage device according to claim 3, wherein the positioning member is shaped to have a cylindrical inner wall surface for holding the roller to keep the center of turning of the tool pot at the specified position, the cylindrical inner wall surface having a cutout passage to pass the support member therethrough when the tool pot is transferred and turned.

5. The tool storage device according to claim 4, wherein the turning member is shaped to close a part of the cutout passage of the positioning member when the tool pot is turned to the position where the tool pot is in the tool exchange state.

6. The tool storage device according to claim 1, wherein the driving mechanism includes:

a fluid-operated mechanism connected to the turning member displaceable to a first position and to a second position by fluid to turn the tool pot in response to a displacement thereof, the fluid-operated mechanism keeping the tool pot at the tool storage state when stopped at the first position and at the tool exchange state when stopped at the second position; and a lock mechanism for locking the fluid-operated mechanism to an immovable state after being displaced from one of the first and second positions to the other and for unlocking the fluid-operated mechanism to a movable state from the immovable state before the fluid-operated mechanism is displaced from the other of the first and second positions to the one.

7. The tool storage device according to claim 6, wherein the tool pot is urged to either the tool storage state or the tool exchange state by a self weight thereof; and the lock mechanism locks the fluid-operated mechanism to the immovable state when the fluid-operated mechanism is displaced against the urging force by the self weight of the tool pot.

8. The tool storage device according to claim 7, wherein the lock mechanism includes:

an engaging member engageable with the fluid-operated mechanism to make fluid-operated mechanism in the immovable state;

a first urging member for urging the engaging member in a direction to engage the engaging member with the fluid-operated mechanism when the fluid-operated mechanism is displaced from the one of the first and second positions to the other; and a second urging member for urging the engaging member in a direction to disengage the engaging member from the fluid-operated mechanism by the fluid supplied for displacing the fluid-operated mechanism from the other of the first and second positions to the one.

9. The tool storage device according to claim 1, wherein the turning regulation mechanism includes a dropping restricting mechanism held in contact with the tool pot for restricting the tool pot from dropping from the transfer mechanism, the dropping restricting mechanism having a part movable from a normal mounting position so that the tool pot is mounted on and dismounted from the transfer mechanism in a state in which the part of the dropping restricting mechanism is moved.

10. The tool storage device according to claim 9, wherein the transfer mechanism includes a chain that circulates on a specified plane;

a turning shaft is disposed to the tool pot; and a bearing is disposed to the transfer mechanism, the bearing having a cutout to support the turning shaft in the state in which an axial direction of the turning shaft agrees with a direction of movement of the turning shaft by the chain and to allow the turning shaft to be mounted and dismounted without dismounting the turning shaft from the tool pot by moving the tool pot in a direction which intersects a plane of movement of the chain.

11. A tool storage device comprising:

a tool pot for holding a tool;

a transfer mechanism for turnably supporting the tool pot and for transferring the tool pot along a specified path including a specified dividing position;

a turning regulating mechanism for regulating the turning of the tool pot at a position other than the dividing position on the specified path and for keeping the tool pot in a tool storage state; and a tilting mechanism for turning at the dividing position the tool pot to one of the tool storage state and a tool exchange state in which the tool pot is mounted and dismounted, wherein the tilting mechanism includes a fluid-operated mechanism displaceable to a first position and to a second position by fluid to turn the tool pot in response to a displacement thereof, the fluid-operated mechanism keeping the tool pot at the tool storage state when stopped at the first position and at the tool exchange state when stopped at the second position, and a lock mechanism for locking the fluid-operated mechanism to an immovable state after being displaced from one of the first and second positions to the other and for unlocking the fluid-operated mechanism to a movable state from the immovable state before the fluid-operated mechanism is displaced from the other of the first and second positions to the one.

12. The tool storage device according to claim 11, wherein the tool pot is urged to either the tool storage state or the tool exchange state by a self weight thereof; and the lock mechanism locks the fluid-operated mechanism to the immovable state when the fluid-operated mechanism is displaced against the urging force by the self weight of the tool pot.

13. The tool storage device according to claim 11, wherein the lock mechanism includes:

an engaging member engageable with the fluid-operated mechanism to make fluid-operated mechanism in the immovable state;

a first urging member for urging the engaging member in a direction to engage the engaging member with the fluid-operated mechanism when the fluid-operated mechanism is displaced from the one of the first and second positions to the other; and a second urging member for urging the engaging member in a direction to disengage the engaging member from the fluid-operated mechanism by the fluid supplied for displacing the fluid-operated mechanism from the other of the first and second positions to the one.

14. The tool storage device according to claim 13, wherein the fluid-operated mechanism includes:

a first cylinder;

a first piston slidable in the first cylinder to partition the first cylinder into two chambers and displaceable by the fluid selectively introduced into one of the chambers; and a first piston rod fixed to the first piston to transmit a movement of the first piston to a movable part provided outside of the first cylinder.

15. The tool storage device according to claim 14, wherein the lock mechanism includes:

a second cylinder disposed on a side of the first piston rod;

a second piston slidable in the second cylinder;

a second piston rod fixed to the second piston and movable to a position for engagement with an engaging groove formed in the first piston rod;

an urging spring disposed in the second cylinder in contact with the second piston to urge the second piston rod in a direction to engage with the first piston rod; and a fluid supply passage for introducing a part of the fluid supplied for displacing the fluid-operated mechanism into the second cylinder to thereby move the second piston rod against the urging of the urging spring in a direction to disengage from the first piston rod.

16. A tool storage device, comprising:

a tool pot for holding a tool;

a transfer mechanism for transferring the tool pot along a specified path, the transfer mechanism having a structure for transferring the tool pot while holding the tool pot removably;

a turning shaft disposed on one of the tool pot and transfer mechanism; and a dropping restricting mechanism engaged with the turning shaft and held in contact with the tool pot for restricting the tool pot from dropping from the transfer mechanism, the dropping restricting mechanism having a part movable from a normal mounting position so that the tool pot is mounted on and dismounted from the transfer mechanism in a state in which the part of the dropping restricting mechanism is moved.

17. The tool storage device according to claim 16, further comprising a bearing disposed on the other of the tool pot and the transfer mechanism for supporting the turning shaft to hold the tool pot by the transfer mechanism in a turnable state, the bearing having a cutout through which the tool pot is freely mounted and dismounted so that the tool pot is held by the transfer mechanism removably.

18. The tool storage device according to claim 16, further comprising:

a turning regulating mechanism for regulating a turning of the tool pot and for keeping the tool pot in a tool storage state at a position other than a dividing position set on the specified path; and a tilting mechanism for tilting the tool pot at the dividing position set on the specified path to a tool storage state or to a tool exchange state in which the tool pot is mounted and dismounted, wherein at least one of the turning regulating mechanism and the tilting mechanism operate as the dropping restricting mechanism.

19. The tool storage device according to claim 17, wherein the transfer mechanism includes a chain that circulates on a specified plane;

the turning shaft is disposed to the tool pot, and the bearing is disposed to the transfer mechanism; and the cutout of the bearing is shaped to support the turning shaft in the state in which an axial direction of the turning shaft agrees with a direction of movement of the turning shaft by the chain and to allow the turning shaft to be mounted and dismounted without dismounting the turning shaft from the tool pot by moving the tool pot in a direction which intersects a plane of movement of the chain.

20. The tool storage device according to claim 19, wherein the tool pot and the transfer mechanism have engaging parts engageable with each other when the tool pot is brought in the tool storage state to thereby restrict the tool pot from dropping from the transfer mechanism when the tool pot is in the tool storage state;

the tilting mechanism has a structure which turns the tool pot at the dividing position while holding the tool pot thereby to restrict the tool pot from dropping from the transfer mechanism when the tool pot is in the tool exchange state; and the tilting mechanism has a part movable from a normal mounting position to enable mounting and dismounting of the tool pot to and from the transfer mechanism by moving the bearing to the dividing position.

* * * * *